Sept. 23, 1969    S. SASLAWSKY    3,469,076
APPARATUS FOR REMOVING FLASHING FROM MOLDED PLASTIC ARTICLES
Filed June 1, 1967    4 Sheets-Sheet 1
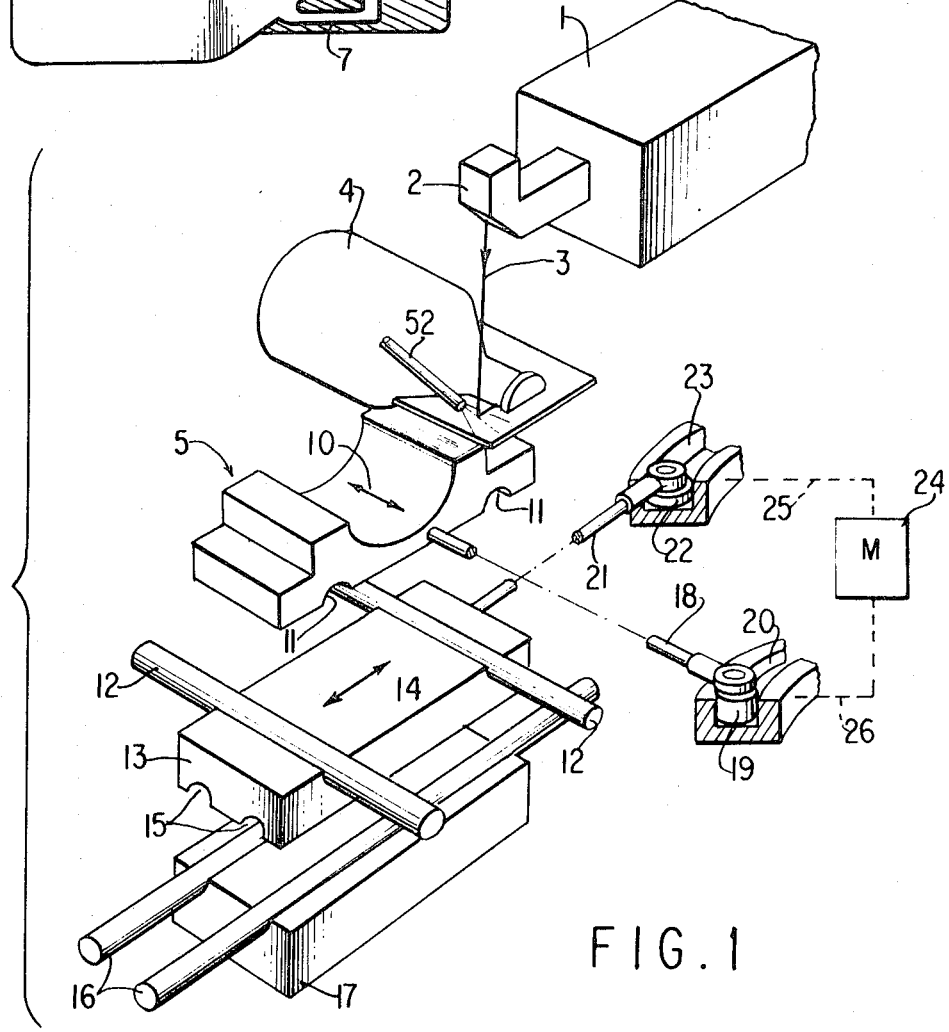
INVENTOR
SHELDON SASLAWSKY
BY
Smythe & Moore
ATTORNEYS

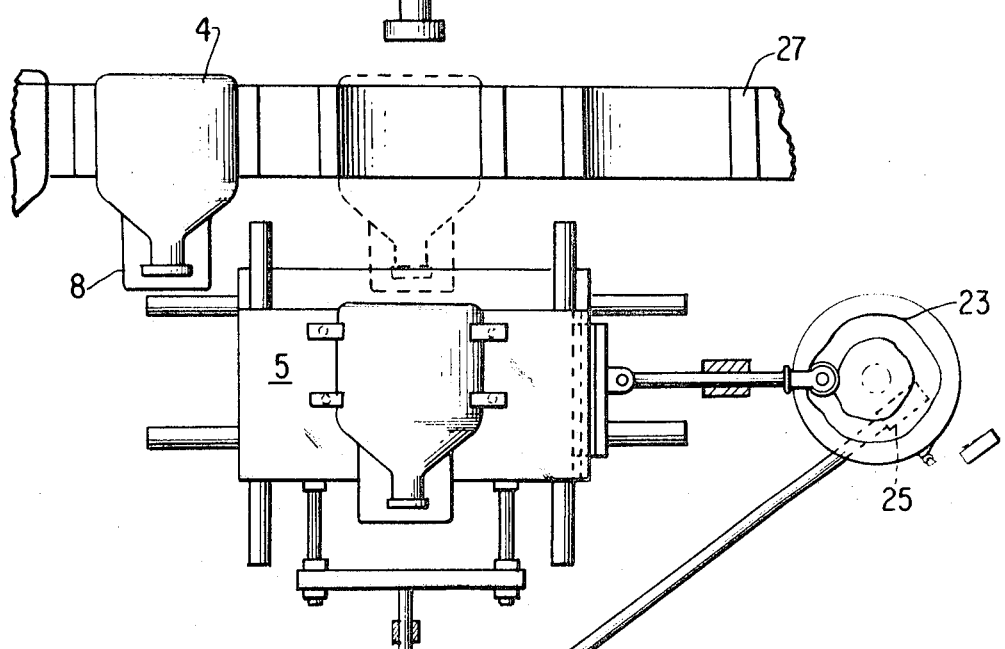
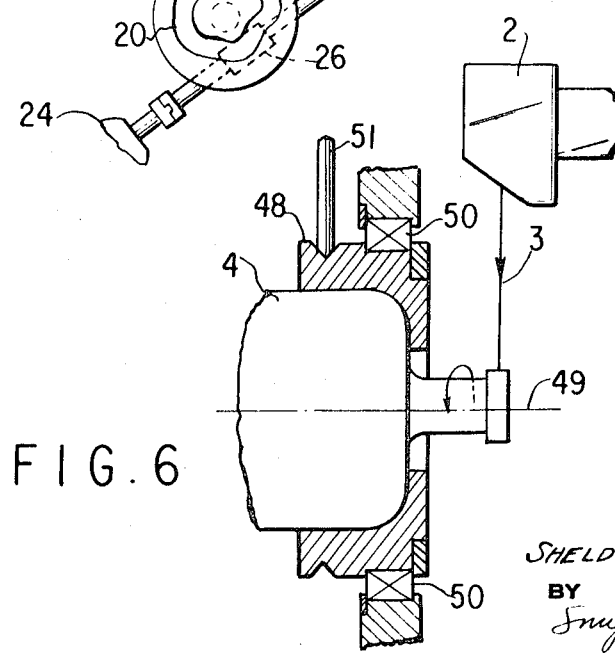

Sept. 23, 1969  S. SASLAWSKY  3,469,076
APPARATUS FOR REMOVING FLASHING FROM MOLDED PLASTIC ARTICLES
Filed June 1, 1967  4 Sheets-Sheet 4

INVENTOR
SHELDON SASLAWSKY
BY
*Smythe & Moore*
ATTORNEY

3,469,076
APPARATUS FOR REMOVING FLASHING FROM MOLDED PLASTIC ARTICLES
Sheldon Saslawsky, Easton, Conn., assignor to The Producto Machine Company, Bridgeport, Conn., a corporation of Connecticut
Filed June 1, 1967, Ser. No. 642,919
Int. Cl. H05b 7/18
U.S. Cl. 219—383  14 Claims

ABSTRACT OF THE DISCLOSURE

An apparatus for removing flashing from molded plastic articles arranged in a fixture. A source of a laser beam and a lens is associated with the fixture whereby a laser beam may be directed along the juncture between the flashing and the molded plastic article to separate the flashing therefrom.

---

The present invention relates to the removal of flashing from molded plastic articles and more particularly to the removal of flashing from molded plastic bottles by directing a laser beam at the flashing adjacent the bottle to separate the flashing therefrom.

In the blow molding of various plastic articles, such as bottles and the like, a thin sheet of flashing generally remains on the article after it has been removed from the mold. When a plastic bottle is formed with a handle near its opening, the flashing is usually found adjacent the open end of the bottle. Because of the presence of the handle, the flashing is not symmetrical and considerable difficulty may be encountered in rapidly and economically removing this flashing. In the prior art, flashing has been removed by various processes, such as by burning or by cutting of the flashing by means of dies. While these prior arrangements have removed the flashing, they have not been completely satisfactory.

One of the objects of the present invention is to provide an apparatus for removing flashing from molded plastic articles in an efficacious manner.

In one aspect of the invention, there may be provided a housing within which is generated a laser beam which is emitted from a housing as is known in the art. The molded plastic article having the flashing which is to be removed is secured in a fixture which in one embodiment of the invention may be movable in two directions. A lens arrangement is provided for directing the beam emitted from the housing to the juncture of the article and the flashing. The housing and beam directing lens arrangement are stationary but the fixture is moved by cam-actuated means along a predetermined path so that the laser beam is directed along the entire length of the juncture between the flashing and the article to separate the flashing therefrom.

A further embodiment is provided to remove the flashing from molded plastic bottles without handles. In this embodiment, the molded plastic bottle is secured in a fixture and the bottle is rotated along its central longitudinal axis. The laser beam is then directed along the outline of the rotating article in the vicinity of the flashing to cut the flashing therefrom.

In another modification of the invention, the molded plastic article is secured in a fixture which is stationary, the housing emitting the laser beam also being stationary. The beam directing structure, including a focusing lens, is mounted in a ball and socket joint for universal movement. A reflecting surface is provided in the beam directing structure at the pivot point to receive the laser beam from the housing and to direct the beam through the lens structure. A cam-actuated structure is attached to the end of the beam directing means opposite from the lens to pivot this structure within the ball and socket joint. The cam-actuated means may comprise a pair of cams which move the beam directing means so that the laser beam is moved along the entire length of the juncture between the flashing and the article to separate the flashing therefrom.

Other objects, advantages and features of the invention will become apparent from the following description and drawings which are merely exemplary.

In the drawings:

FIG. 1 is an exploded perspective view of an embodiment of the invention wherein the laser beam is stationary and the fixture securing the molded plastic article is movable;

FIG. 2 is a plan view of a molded plastic bottle with a handle and showing the flashing which is to be removed;

FIG. 3 is an elevational view of a portion of the bottle molding apparatus showing the molded bottle being ejected into a fixture for removal of the flashing;

FIG. 6 is an elevational view of another modification wherein the molded article is rotated and the laser beam is moved along the outline of the rotated article;

In the drawings, like reference numerals will be used to indicate the same parts.

Figure 5:
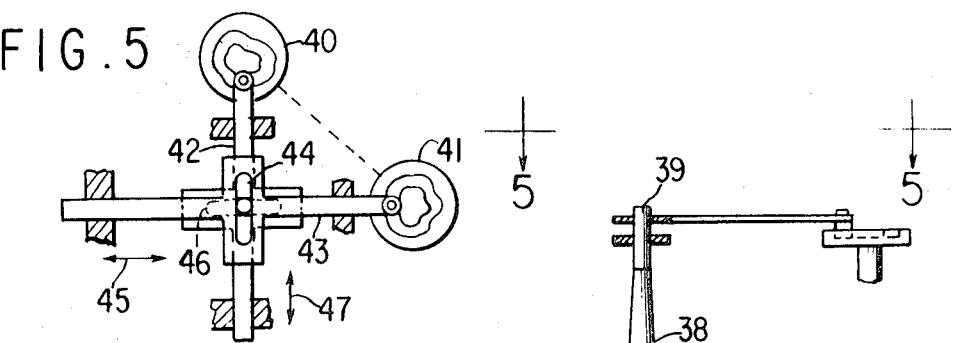
FIG. 5 is a top plan view of the apparatus illustrated in FIG. 4.

In the embodiment of FIG. 1, there is provided a stationary housing 1 within which is generated a collimated beam of coherent light which is emitted through a lens arrangement 2 affixed to the housing, the beam emerging at 3. The housing may comprise a body of "laser material" such as a synthetic ruby rod and a xenon flash lamp in optical communication therewith. In a preferred form, the beam may be continuous. In another form, a flash lamp is connected to a delay line or pulse shaping circuit which is connected to the output of a controllable direct current power supply. In the latter form, closure of a push-button circuit causes energization so as to ionize gas within the flash lamp which in turn activates the laser and generates a pulsed laser beam therefrom. The laser beam may have a diameter of about 0.002 inch. A totally reflecting prism (not shown) may be positioned within the lens arrangement 2 to reflect the laser beam 3 downwardly as shown in FIG. 1.

The source of the laser beam may be connected either to an alternating current or to a direct current source, each of which will give different effects. When the alternating current source is used, the current will be pulsating and, accordingly, a rough edge or beaded effect will be provided when the flashing is removed. The use of direct current will result in a straight, uninterrupted edge upon the removal of the flashing.

A blow molded plastic bottle 4 is positioned in a fixture 5. The bottle 4 has an open end 6 (FIG. 2) and a handle 7 with flashing 8. It is desired to separate the flashing from the bottle along the entire length of the juncture between the flashing and the bottle, which juncture is indicated at 9.

One type of movable table or fixture is shown in FIG.

1. Fixture 5 therein is movable in the direction indicated by the double-ended arrow 10 and is provided with spaced, parallel, transversely extending grooves 11 which mate with and slide along cylindrical rods 12. The rods 12 are mounted upon an intermediate plate 13 which is movable in the directions indicated by double-ended arrow 14 and perpendicular to the movement of fixture 5. Intermediate plate 13 is similarly provided with a pair of spaced, parallel, longitudinally extending grooves 15 which mate with and slide along cylindrical rods 16 mounted upon a stationary base 17.

The fixture 5 is attached by means of a follower rod 18 to a cam follower 19 received within a cam groove 20. Similarly, intermediate plate 13 is attached by a follower rod 21 to a cam follower 22 received in cam groove 23. Cam grooves 20 and 23 are shaped so that the bottle 4 will be moved along a predetermined path so that laser beam 3 will follow the juncture line between the bottle and the flashing. A suitable controlling arrangement for moving the cams is indicated generally at 24 and operativey connected at 25 and 26 to the cams 23 and 20, respectively. The cams may be accurately controlled so that the laser beam 3 is adjacent the surface of the bottle 4 to cut and separate the flashing adjacent the bottle surface.

The movement of the bottle 4 or of the laser beam 3 along a predetermined path can be controlled by suitable known control arrangements. One such control arrangement is a tracer such as used in machine tool operation and which would trace the outline of the bottle from which the flashing is to be removed. In another arrangement, the outline of the bottle may be used as a pattern and traced by a suitable cam which is operatively connected to guide either the bottle or the laser beam along a predetermined path.

A discharge pipe 52 is connected to a suitable source of air or gaseous mixture to introduce a direct blast at the juncture of the article and the flashing which is contacted by the laser beam. When the plastic article is formed of polyethylene, a considerable quantity of oxygen must be provided to burn the polyethylene by the laser or the burning will produce a large quantity of carbon deposits. When other types of a plastic are used for the article, other suitable atmospheres of an air or mixture should be provided to promote complete oxidation at the point where the article and flashing are contacted by the laser beam.

The operative relation between cams 20 and 23 is illustrated in FIG. 3. As may be seen, the molded bottle 4 with the flashing attached is conveyed by conveyor 27 to a point where the bottle is ejected by ejection member 28 acting upon the closed end of the bottle. The bottle is moved onto the fixture 5 into the position shown in FIG. 3. As soon as the bottle is secured on the fixture 5, the movement of the bottle along a predetermined path under the action of the cams commences and the laser beam is initiated to separate the flashing.

Since laser beams can be readily produced which have a diameter of 0.001 inch or 0.002 inch, the beam can be accurately positioned on the article or the flashing. The laser beam can be directed to the middle of the pinched area and the intense heat generated by the beam will eliminate the rough edges that are now formed with existing trimming techniques.

Figure 4:
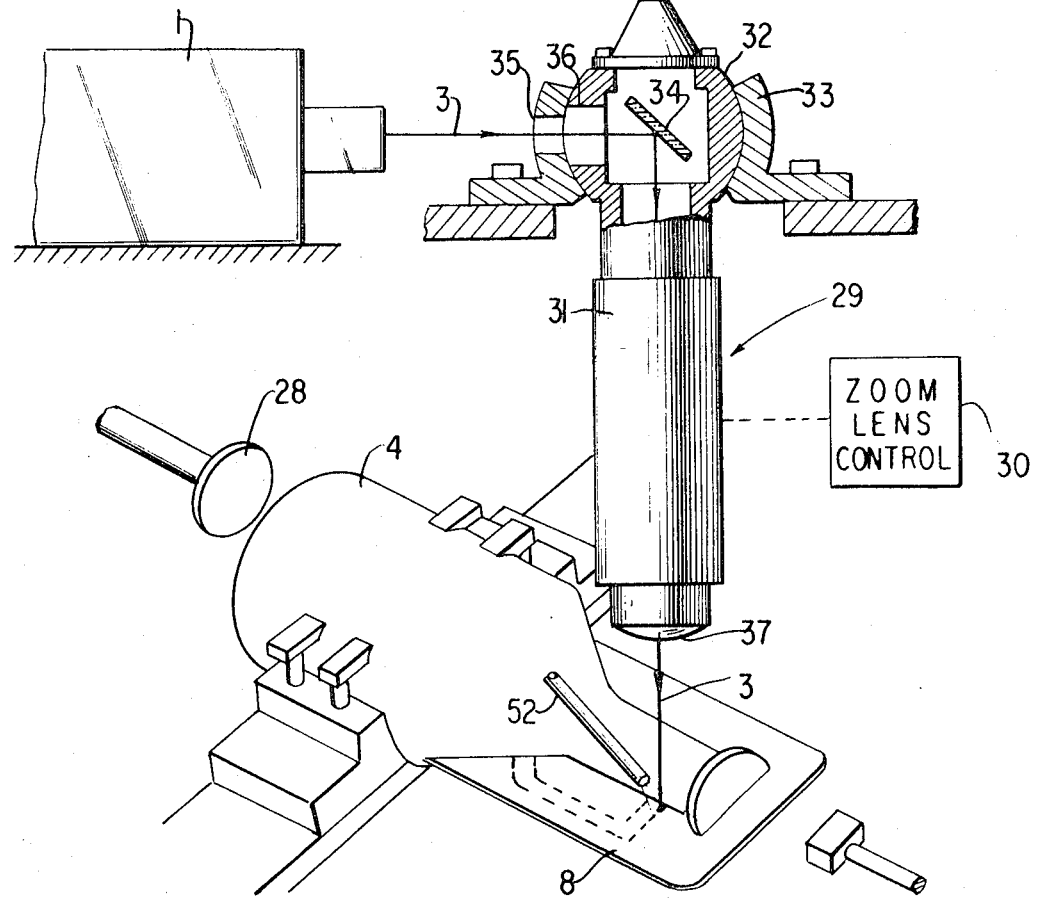
FIG. 4 is a view partly in perspective and partly in elevation of a further modification of the invention wherein the molded article is stationary and the laser beam is moved.
Figure 7:
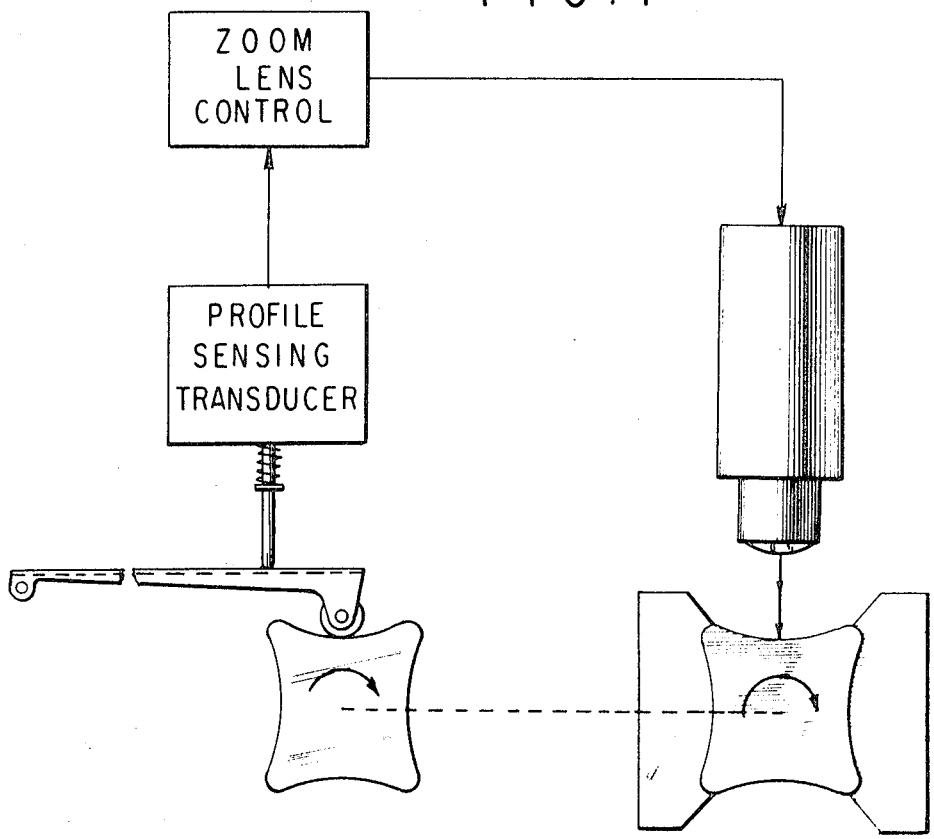
FIG. 7 is an elevational view of another form of laser beam housing and fixture for supporting and rotating the molded bottle.
Figure 8:
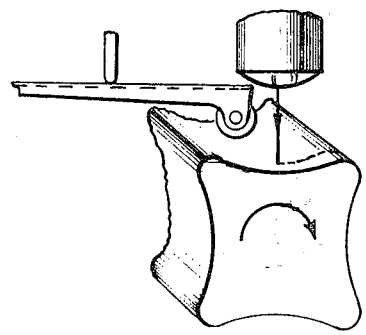
FIG. 8 is a perspective view of a portion of another form of fixture for supporting and rotating the molded bottle.

A modification is shown in FIGS. 4 and 5 wherein the molded plastic bottle is held stationary and the laser beam is moved along a predetermined path to remove the flashing from the bottle. The laser beam is moved by a beam directing structure indicated generally at 29 and essentially comprising a "zoom" lens, which as known in the art is actuated by a control arrangement 30. The "zoom" lens is housed within a cylindrical casing 31, the upper end of which is provided with a ball 32 movably received within a socket 33 to form a ball and socket joint so that the casing 31 is capable of universal movement. At the center of the ball 32 there is provided a reflecting surface 34 which receives the laser beam as emitted from housing 1 through openings 35 and 36 in the socket and ball, respectively. The beam is then reflected downwardly through the casing 31 to emerge from objective lens 37.

An extension 38 is mounted on the ball 32 and is axially aligned with the longitudinal central axis of casing 31. The upper end 39 of the extension is operatively connected to groove cams 40 and 41 by follower arms 42 and 43, respectively. Follower arm 43 has a slot 44 transverse to its direction of movement as indicated by the double-ended arrow 45. The slot 44 receives end 39 of the extension. Similarly, follower arm 42 is provided with transverse slot 46 which is transverse to its direction of movement as indicated by the double-ended arrow 47. The movement of the cams is controlled by a suitable arrangement such as illustrated in connection with FIGS. 1 and 3.

In operation, the laser beam 3 is directed against the reflecting surface 34 and the movement of the casing 31 under the action of cams 40 and 41 will direct laser beam 3 along the entire juncture of the flashing and the plastic bottle to cut the flashing therefrom. Thus, the entire assembly consisting of extension 38, ball 32 and casing 31 pivots about the center of the ball and socket joint 32, 33.

In a further modification shown in FIG. 6, the bottle 4 may be mounted in a fixture 48 which is rotatable about the central longitudinal axis 49 of the bottle. During rotation of the bottle, laser beam 3 is directed along the outline of the rotating bottle in the vicinity of the flashing. It will be apparent that this modification is suitable only when the bottle structure is symmetrical in the vicinity of the flashing. The fixture 48 is journaled in bearings 50 and may be rotated by a driving belt 51 connected to a source of power.

Thus, it can be seen that the present invention has provided an extremely effective apparatus for the removal of flashing from molded plastic articles with a minimum of effort on the part of the operator. Either the article and the flashing or the laser beam moves along a predetermined path which conforms to the juncture of the flashing with the article. Since the laser beam can be accurately focused, it will be apparent that the surface of the plastic article will be smooth after the flashing has been separated therefrom.

It should be apparent that changes in details of construction can be made and that the invention can be adapted to various usages without departing from the spirit of the invention except as defined in the appended claims.

What is claimed is:

1. In an apparatus for removing flashing from tubular molded plastic articles, the combination of a housing having means therein for generating a laser beam which is emitted from said housing, a fixture horizontally arranged below said beam means and having concave means for supporting a tubular molded plastic article transversely reliative to and generally in alinement with said beam means, means for directing the laser beam at the juncture of the article and the flashing, and means operatively connected to one of said housing, said beam directing means, and said fixture for moving said one of said housing, beam directing means and fixture along a predetermined path to direct the laser along the entire length of the juncture between the flashing and the tubular article to separate the flashing therefrom.

2. An apparatus for removing flashing as claimed in claim 1 wherein said housing and said beam directing means are stationary and said fixture is movable in a plane perpendicular to the path of said laser beam.

3. An apparatus for removing flashing as claimed in claim 1 wherein said fixture is rotatable about the central longitudinal axis of the molded article secured therein, and said housing is moved along a path conforming to the outline of the rotating article in the vicinity of the flashing attached thereto.

4. An apparatus for removing flashing as claimed in claim 1 wherein said fixture is stationary and said housing is movable.

5. An apparatus for removing flashing as claimed in claim 1 wherein said fixture and said housing are stationary and said beam directing means is movable.

6. An apparatus for removing flashing as claimed in claim 5 wherein said beam directing means is pivotally mounted for universal movement, and cam-actuated means is connected to said beam directing means for moving said beam directing means along the juncture of the article and the flashing.

7. An apparatus for removing flashing as claimed in claim 5 wherein said beam directing means comprises a casing having lens means therein for focusing a laser beam, a ball and socket joint operatively connected to one end of said casing, and cam-actuated means connected to said one end of said casing for moving said beam directing means along the juncture of the article and the flashing.

8. An apparatus for removing flashing as claimed in claim 7 and further comprising a beam reflecting surface within said ball and socket joint of said casing and positioned to receive the laser beam emitted from said housing and to reflect the beam through said casing lens means.

9. An apparatus for removing flashing as claimed in claim 7 wherein said casing has an extension at said one end, said cam-actuated means being connected to said extension.

10. An apparatus for removing flashing as claimed in claim 9 wherein said cam-actuated means comprises first and second followers respectively, said followers being at right angles to each other and in a plane perpendicular to the longitudinal axis of said casing and connected to said extension.

11. An apparatus for removing flashing as claimed in claim 1 and further comprising means responsive to the outline of the article for guiding said moving means along a predetermined path conforming to said outline.

12. An apparatus for removing flashing as claimed in claim 1 wherein said laser beam generating means has a direct current source so that a straight, uninterrupted edge is formed when the flashing is removed.

13. An apparatus for removing flashing as claimed in claim 1 wherein said laser beam generating means has an alternating current source so that a pulsating laser beam is emitted to form a rough edge when the flashing is removed.

14. An apparatus for removing flashing as claimed in claim 1 and further comprising means for forming an atmosphere of an air mixture where the laser beam contacts the article and the flashing to promote oxidation.

References Cited

UNITED STATES PATENTS

| | | | |
|---|---|---|---|
| 3,112,850 | 12/1963 | Garibotti | 225—2 |
| 3,226,527 | 12/1965 | Harding | 219—384 |
| 3,377,899 | 4/1968 | Wolford | 83—213 |

FOREIGN PATENTS 1,220,999  7/1966  Germany.

VOLODYMYR Y. MAYEWSKY, Primary Examiner

U.S. Cl. X.R.

18—5; 83—914; 219—121; 250—42